(12) United States Patent
Goetz et al.

(10) Patent No.: US 6,558,492 B2
(45) Date of Patent: May 6, 2003

(54) SCREEN ELEMENT FOR MOTOR VEHICLES

(75) Inventors: Matthias Goetz, Markgroeningen (DE); Joerg Riehle, Stuttgart (DE)

(73) Assignee: ORIS Fahrzeugteile Hans Riehle GmbH, Moeglingen (DE)

( * ) Notice: Subject to any disclaimer, the term of this patent is extended or adjusted under 35 U.S.C. 154(b) by 132 days.

(21) Appl. No.: 09/804,485

(22) Filed: Mar. 12, 2001

(65) Prior Publication Data

US 2001/0052214 A1 Dec. 20, 2001

(30) Foreign Application Priority Data

Mar. 13, 2000 (DE) .......................................... 100 12 167

(51) Int. Cl.⁷ ............................................... B32B 31/18
(52) U.S. Cl. ..................... 156/73.3; 156/73.1; 156/251; 156/308.2
(58) Field of Search ................................ 156/73.1, 73.3, 156/250, 251, 308.2, 510, 515, 530, 580.1, 580.2

(56) References Cited

U.S. PATENT DOCUMENTS

| 4,296,962 A | 10/1981 | Jardin et al. |
| 4,477,116 A | 10/1984 | Viertel et al. |
| 4,630,859 A * | 12/1986 | Bienert et al. .............. 296/217 |
| 5,219,201 A | 6/1993 | Götz et al. |
| 5,253,829 A | 10/1993 | Willey |
| 5,660,429 A * | 8/1997 | Wienchol ................... 296/217 |
| 5,702,150 A | 12/1997 | Reuter et al. |
| 5,738,404 A | 4/1998 | Stadler et al. |
| 5,803,530 A | 9/1998 | Skrzypek et al. |
| 6,257,658 B1 * | 7/2001 | Nabuurs et al. ............ 296/223 |

FOREIGN PATENT DOCUMENTS

| DE | 31 28 853 | 2/1983 |
| DE | 37 11 044 | 10/1988 |
| DE | 38 36 375 | 6/1989 |
| DE | 37 44 831 | 11/1989 |
| DE | 44 46 764 | 6/1996 |
| DE | 195 33 897 | 3/1997 |
| EP | 0 763 446 | 3/1997 |

OTHER PUBLICATIONS

Stoeckhert, Dr. K., "Kunststoff–Lexikon", Carl Hanser Verlag, München, 1975.

* cited by examiner

Primary Examiner—James Sells
(74) Attorney, Agent, or Firm—Barry R. Lipsitz; Douglas M. McAllister

(57) ABSTRACT

In order to improve a screen element for motor vehicles, in particular, wind blocker or sun protection, comprising a frame and a piece of flat material held by the frame and extending over an area enclosed by the frame, in such a manner that this is simple to produce and has as permanent a connection as possible between the piece of flat material and the frame it is suggested that the piece of flat material be fixed permanently on the frame in that at least one frame part element consisting of plastic material is connected to an additional part by way of a connecting area of the plastic material heated up by means of a sonotrode, softened and hardened.

25 Claims, 12 Drawing Sheets

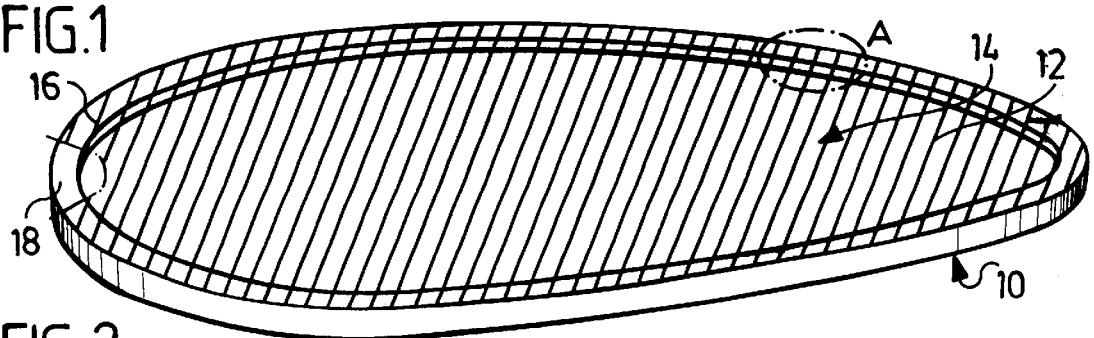
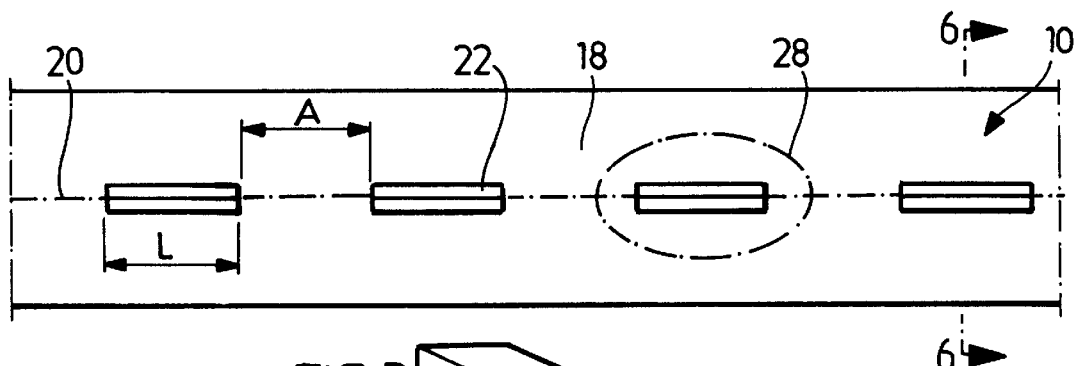
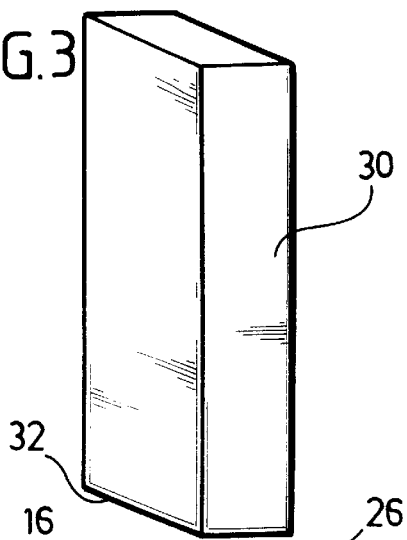
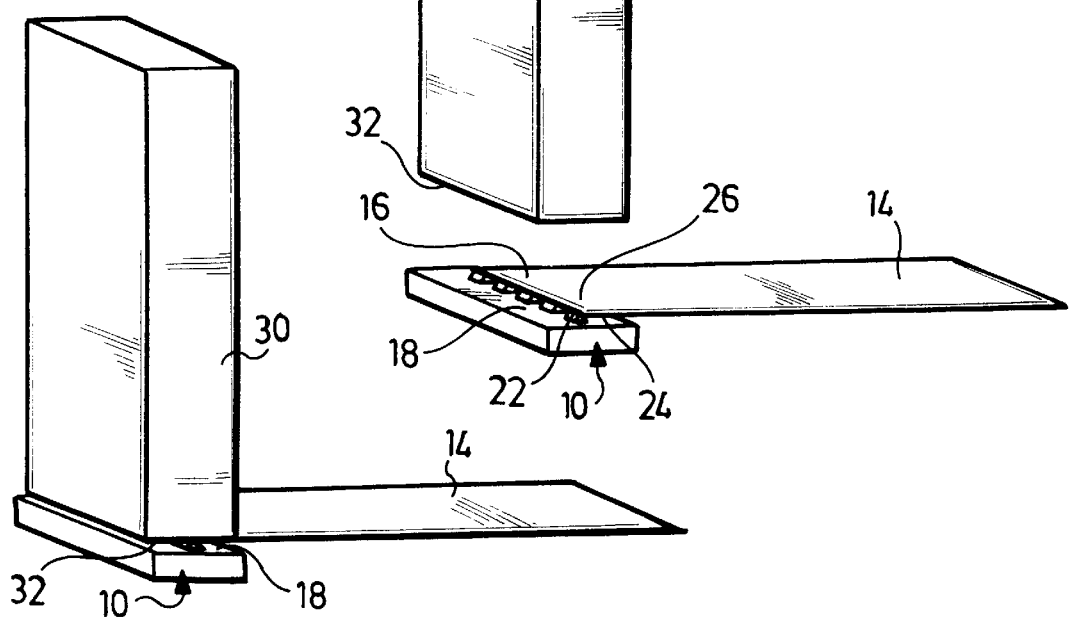

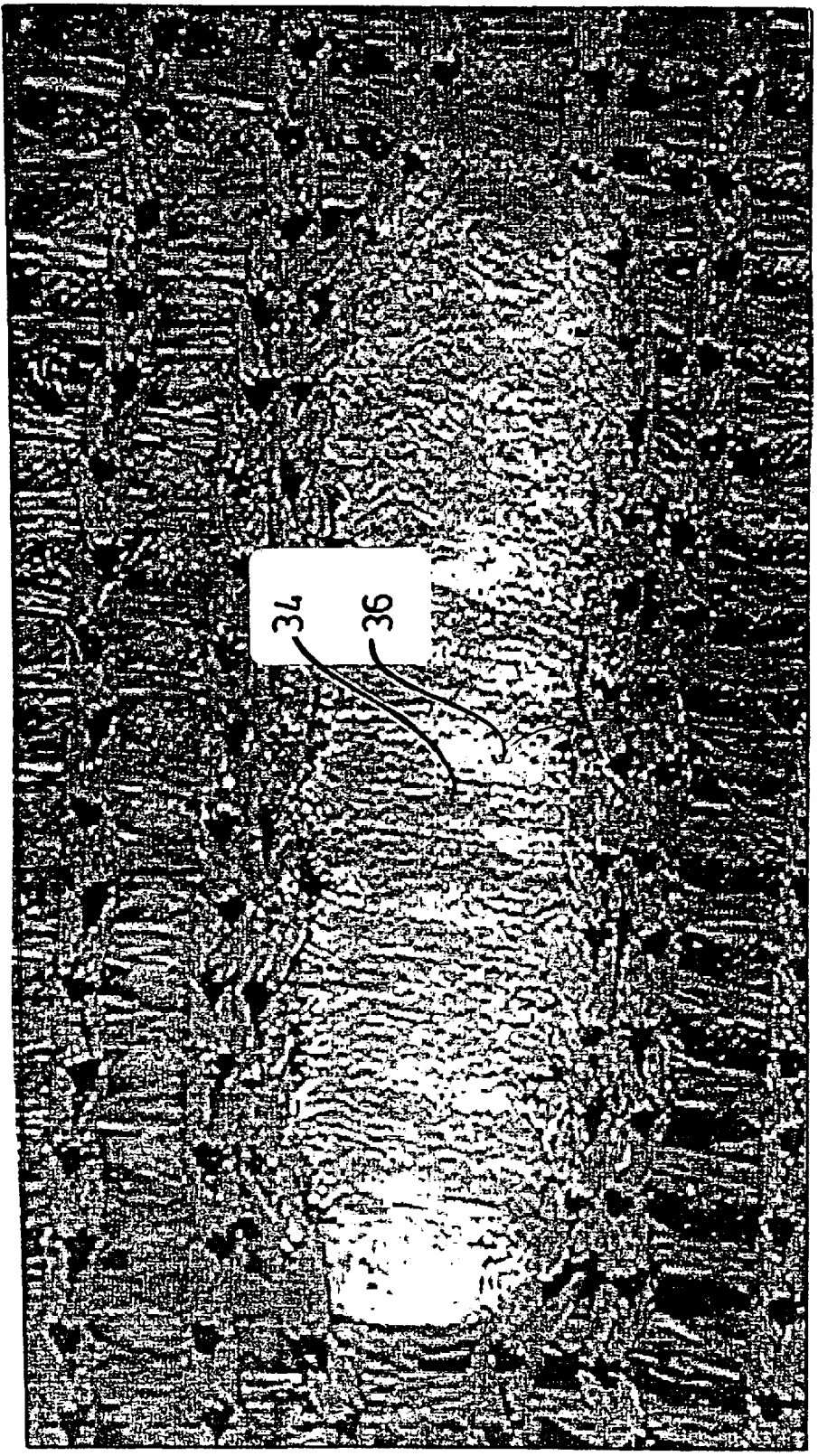

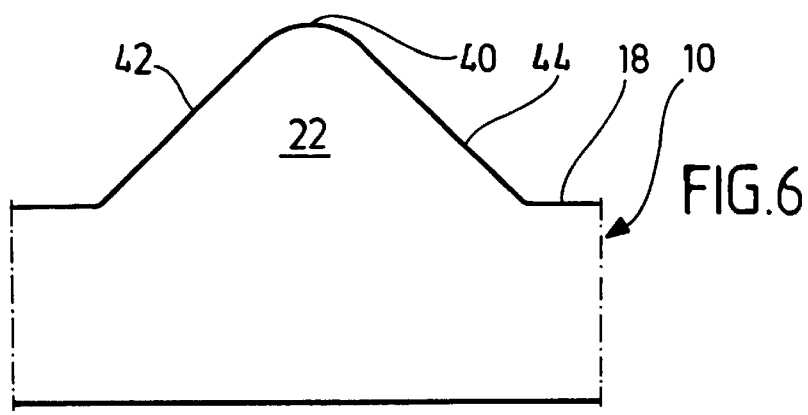
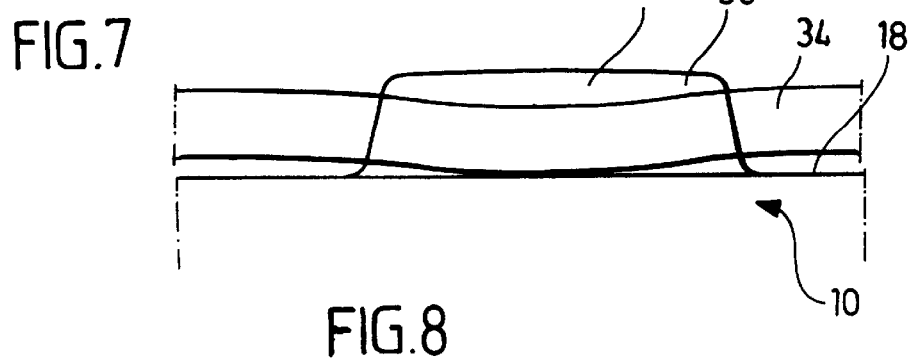
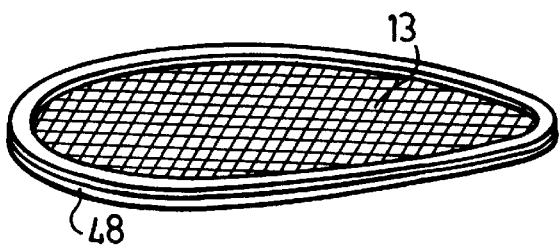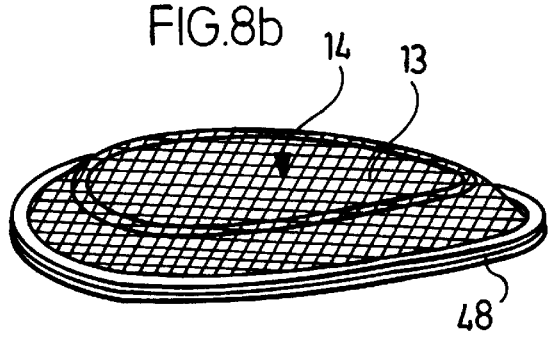
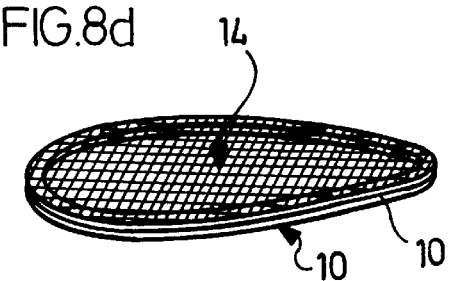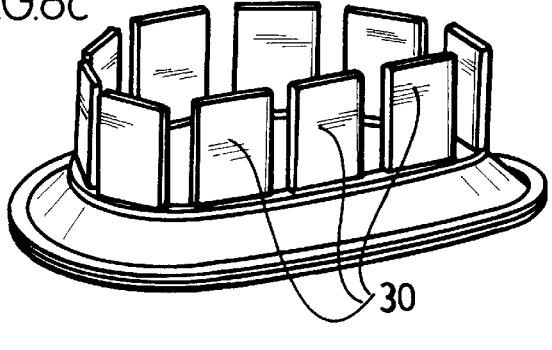

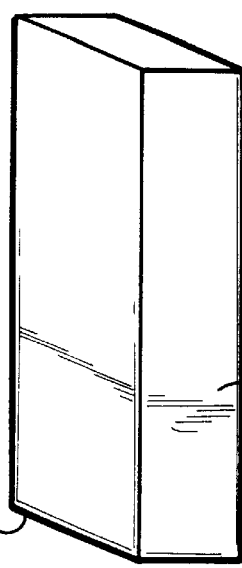
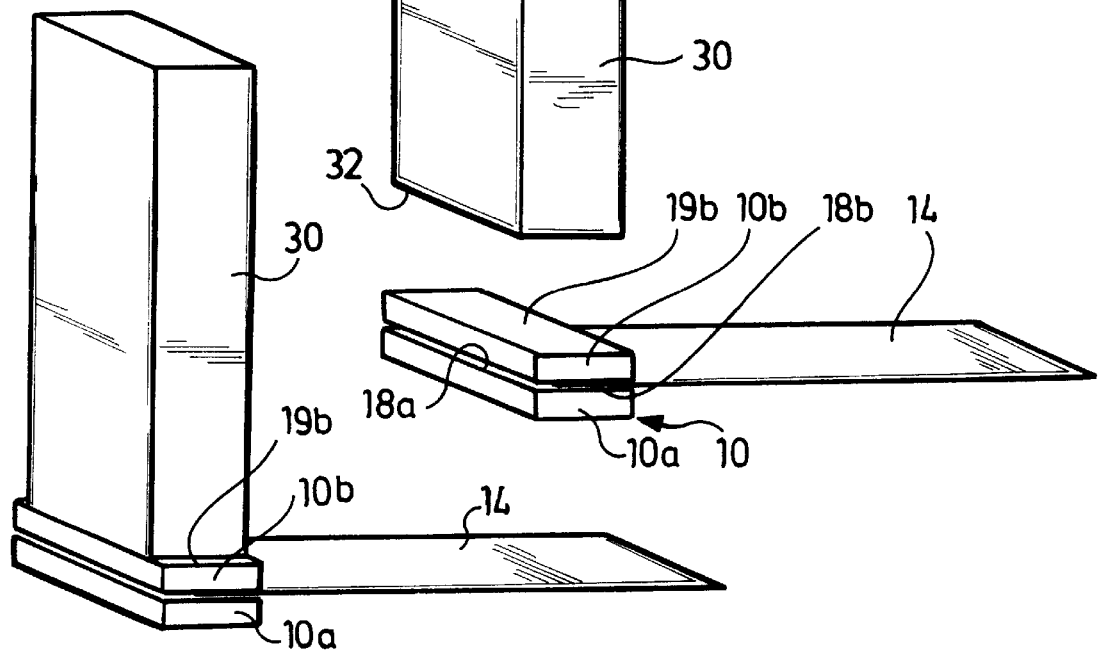
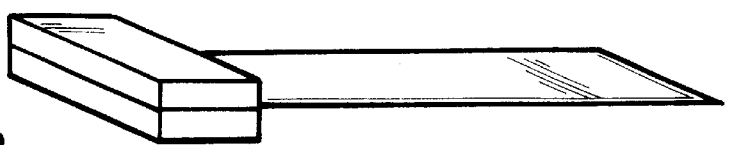
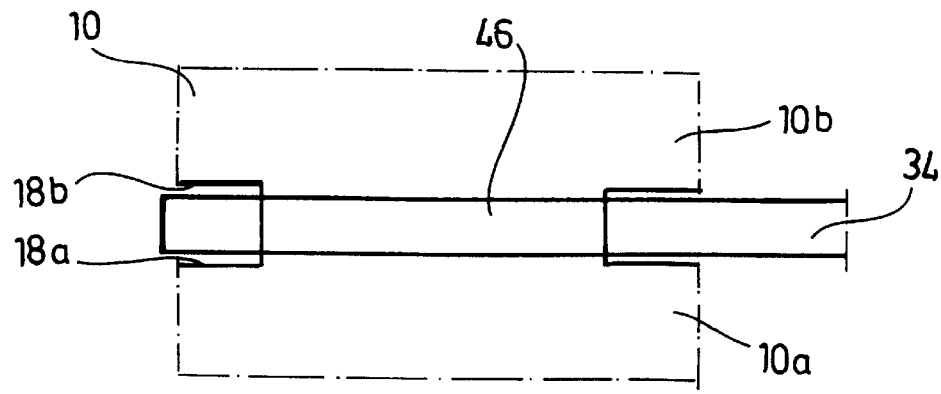

FIG.13
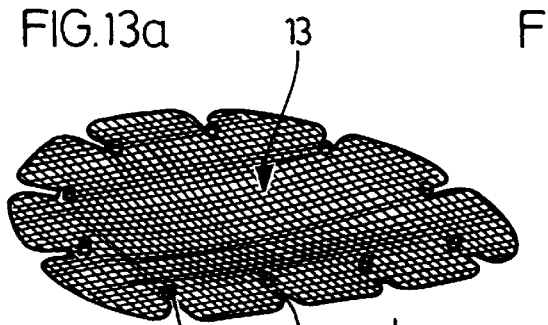
FIG.13a
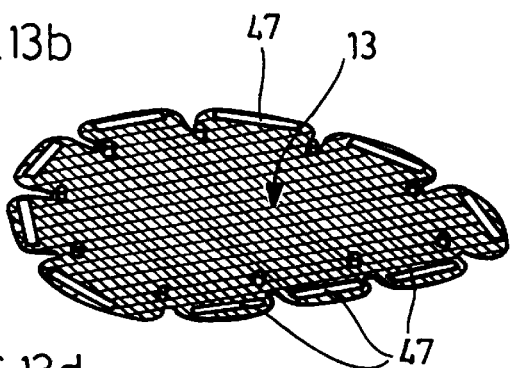
FIG.13b
FIG.13c
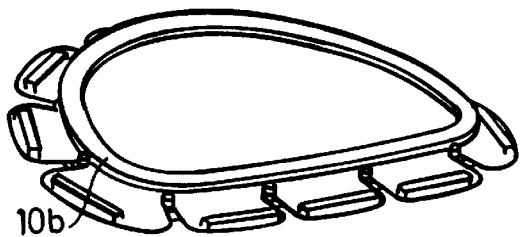
FIG.13d
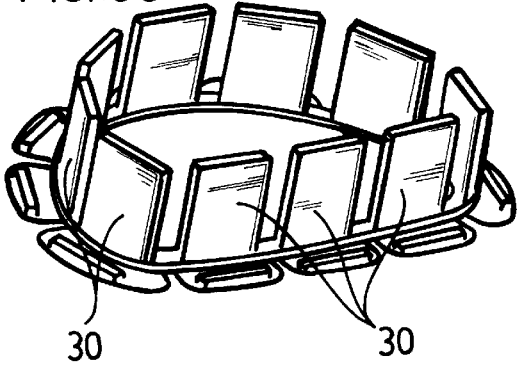
FIG.13e
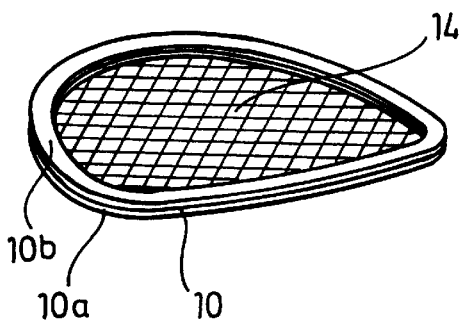
FIG.13f

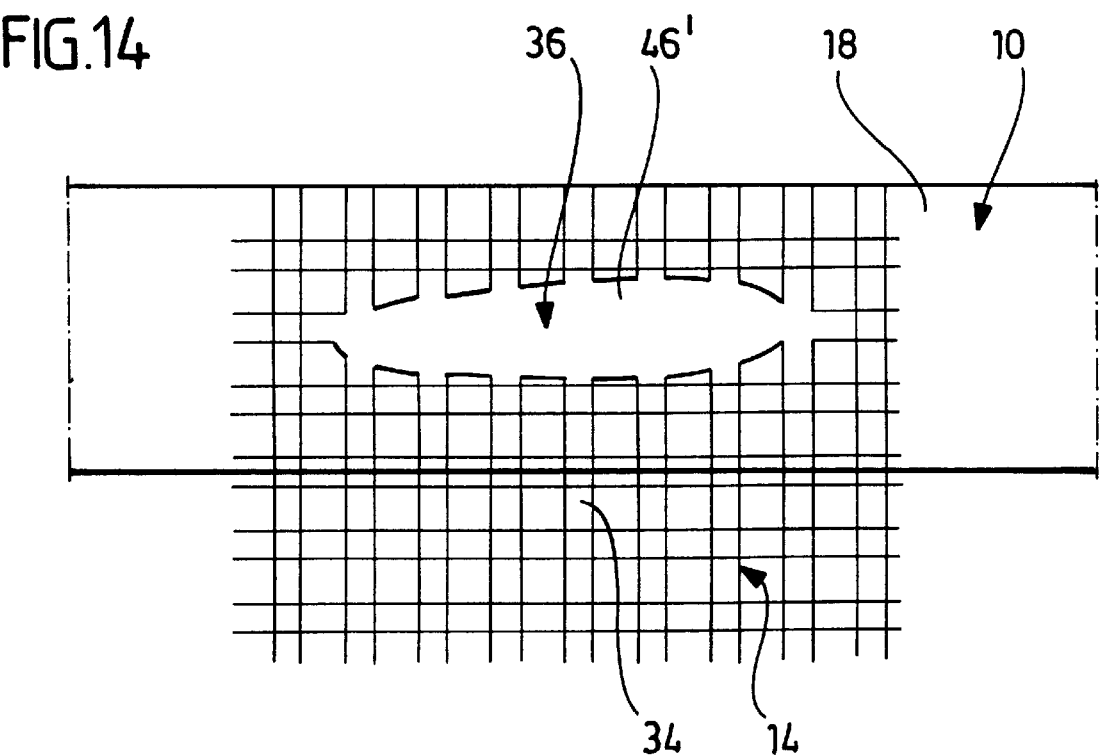
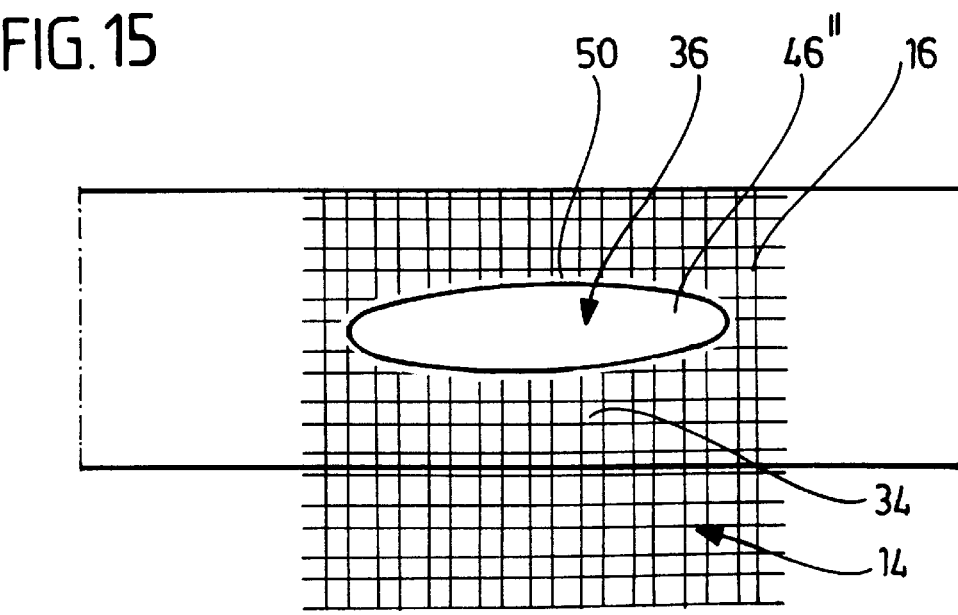

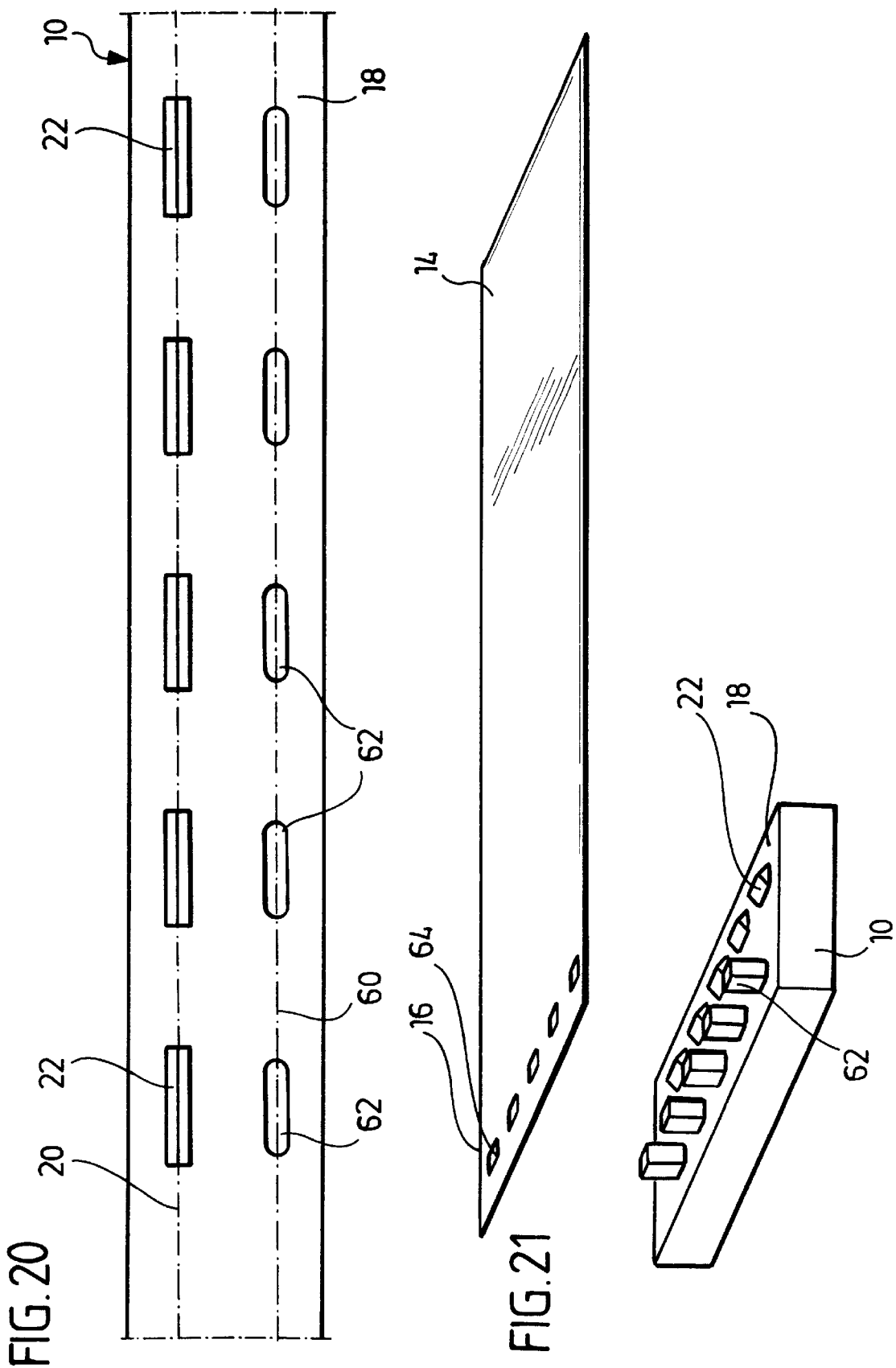

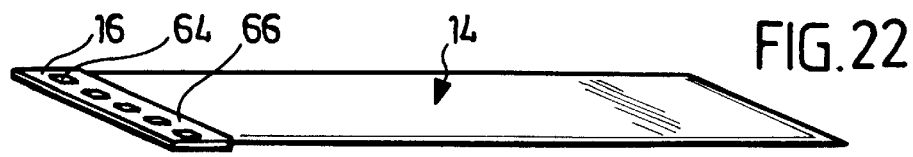
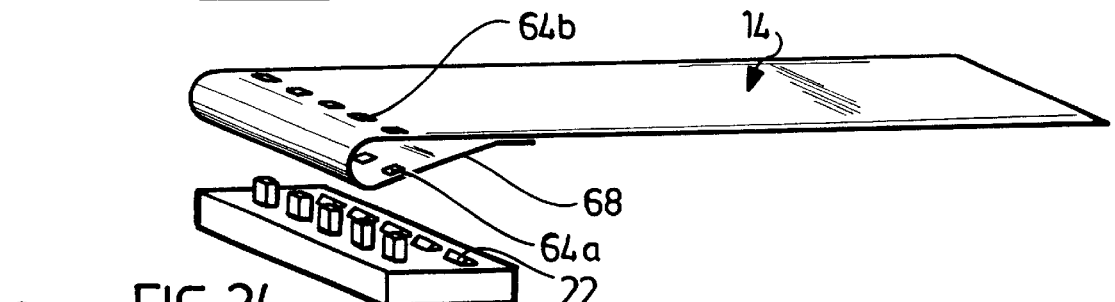
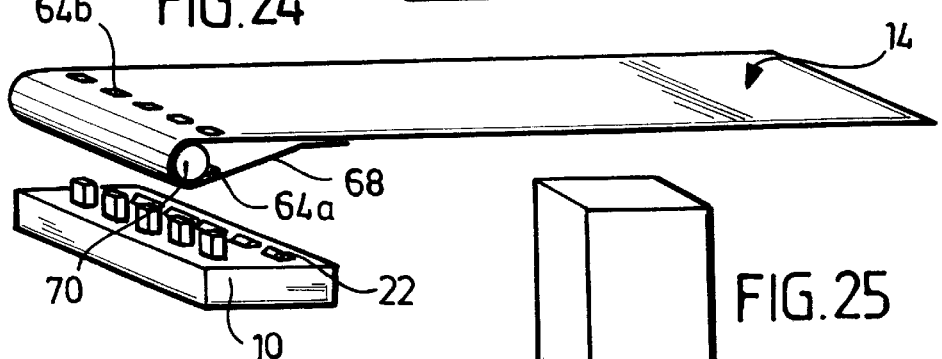
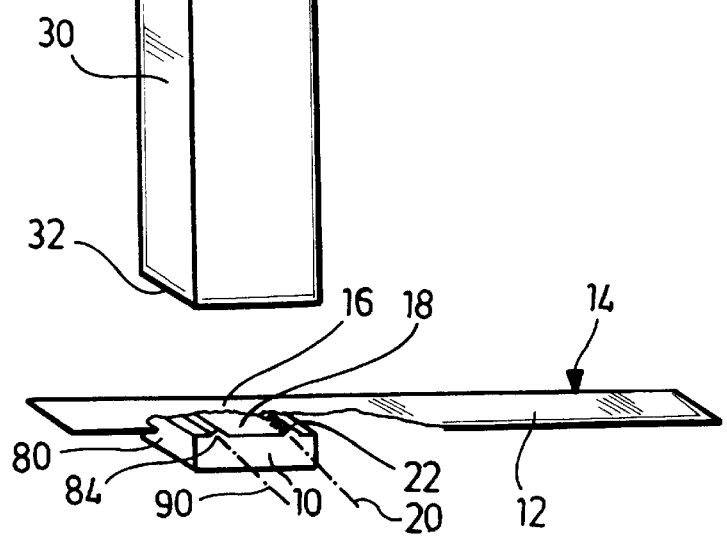

SCREEN ELEMENT FOR MOTOR VEHICLES

The present disclosure relates to the subject matter disclosed in German Application No. 100 12 167.5 of Mar. 13, 2000, the entire specification of which is incorporated herein by reference.

The invention relates to a screen element for motor vehicles, in particular, a wind blocker or a sun protection, comprising a frame and a piece of flat material held by the frame and extending over an area enclosed by the frame.

Screen elements of this type are known from the state of the art. In these cases, the piece of flat material is fixed on the frame by means of force locking, for example, by the pressing in of an elastic ring.

Such a fixing of the piece of flat material causes problems since the production of the force-locking connection is expensive and, in addition, the force-locking connection does not always display the desired fatigue strength.

The object underlying the invention is therefore to improve a screen element of the generic type in such a manner that this is simple to produce and has as permanent a connection as possible between the piece of flat material and the frame.

This object is accomplished in accordance with the invention, in a screen element of the type described at the outset, in that the piece of flat material is fixed permanently on the frame in that at least one frame part element consisting of a plastic material is connected to an additional part by way of a connecting area of the plastic material which is heated up by means of a sonotrode, softened and hardened.

The advantage of the inventive solution is to be seen in the fact that the melting of the plastic material, preferably, a thermoplastic material by means of a sonotrode offers a simple possibility of fixing the piece of flat material on the frame, on the one hand, inexpensively and, on the other hand, permanently.

A particularly preferred embodiment of the inventive solution provides for the frame part element to be connected to the edge area of the piece of flat material as additional part, i.e. that a direct connection between the frame part element and the edge of the piece of flat material can be produced by way of the softening and hardening of the connecting area.

This solution is particularly advantageous since it allows a secure fixing of the piece of flat material on the frame without any complicated connection techniques having to be used.

Such a fixing of the edge area of the flat material on the frame allows, in particular, automation of the production and thus an extremely inexpensive production.

Such a connection between the edge area of the piece of flat material and the frame part element can be produced in the most varied of ways.

One advantageous embodiment, for example, provides for the edge area of the piece of flat material to be embedded in the connecting area softened by the sonotrode and subsequently hardened. This means that no change in the material of the piece of flat material itself takes place as a result of the action of the sonotrode but merely an embedding thereof in the softened and subsequently hardened connecting area and thus a type of form-locking connection between the edge area of the piece of flat material and the frame part element.

A particularly favorable connection can be produced when the flat material is a woven or knitted or braided fabric so that the softened or melted plastic material saturates the edge area of the woven or knitted or braided fabric and thus embeds the fibers thereof in the connecting area essentially undamaged so that an extremely permanent, form-locking connection between the edge area of the flat material and the frame part element can be produced.

Alternatively thereto, an additional advantageous embodiment of the invention provides for the piece of flat material to be produced from a plastic material which can likewise be heated up by ultrasound, softened and subsequently hardened and has formed a connection, for example, a type of welding connection with the plastic material of the frame part element due to the softened plastic materials flowing into one another.

This solution expressly provides for the alteration of the geometrical shape of the material of the piece of flat material insofar as this is likewise melted and thus forms an intimate connection with the plastic material of the area of the frame part.

In the case of fibers, this presupposes that the fibers lose their fiber structure and, insofar as they extend through the connecting areas, have formed an intimate connection with the plastic material of the frame part element in the connecting areas due to softening.

In principle, the inventive solution also comprises all the solutions, with which an inventive connection is produced between the edge area of the piece of flat material and the frame along a connecting line, wherein the connecting area can therefore extend along the connecting line.

A particularly preferred solution does, however, provide for the edge area of the piece of flat material to be fixed on the frame part element in connecting areas arranged so as to follow one another at a distance along a connecting line. Such a solution has the great advantage that, as a result of the connecting areas being arranged in spaced relationship, even in the case of any damage to the edge area of the piece of flat material, either due to damage to the fibers or to too great a softening of the material, this cannot continue along the entire connecting line but is always interrupted.

In addition, the effect of the ultrasound is even better and more greatly localized due to the connecting areas being arranged at a distance from one another and so the connection between the frame part element and the respectively other part can also be produced in a more defined manner, in particular, with a defined softening of the plastic material.

In this respect, it is particularly favorable when the connecting areas are arranged at a distance from one another which corresponds in its order of magnitude to the extension of the connecting areas in the direction of the connecting line.

In principle, it would be conceivable to define the connecting areas in that these result due to the ultrasonic effect, for example, with local pressure due to the sonotrode, in addition.

However, in order to avoid any undefined formation of the connecting areas in this respect, as well, it is preferably provided for the connecting areas to be predetermined by plastic material agglomerations. Such plastic material agglomerations not only have the advantage that a specific local effect of the ultrasound can be achieved during the formation of the connection but also the advantage that enough material is available in the case of the plastic melt then forming to create a secure connection between the frame part element and the corresponding part, i.e. the edge area of the flat material or the other part to be connected.

Particularly when the flat material is a woven or knitted or braided fabric it is advantageous when sufficient plastic material is available for the plastic material melt which can then reliably saturate the edge area of the woven or knitted or braided fabric and thus embed the fibers.

The advantage of a sufficiently large quantity of plastic material being available is, however, also given in the case where the material of the edge area of the piece of flat material melts since, as a result, a good connection of the two melting materials is possible.

The presence of such a plastic material agglomeration may be achieved in any desired manner. For example, it would be conceivable to apply, in addition, particles of plastic material or powdered plastic material to the connecting areas provided prior to any action of the sonotrode.

However, the plastic material agglomeration later desired can be achieved particularly advantageously when the frame part element is provided with the plastic material agglomerations forming the connecting areas.

A particularly advantageous embodiment of the inventive solution provides for the edge area of the flat material to be fixed permanently on the frame part element only in the connecting areas following one another along the connecting line, i.e. that the permanent fixing extends only to the connection of the edge area of the flat material with the corresponding frame part element and no additional, permanent fixing of the flat material is provided. Such a solution has proven to be particularly inexpensive.

In conjunction with the embodiment described thus far, it has primarily been assumed that the other part, which is intended to be connectable to the frame part element for the heating up and softening of the plastic, is the edge area of the flat material.

Another, advantageous solution provides, however, for the other part to be an additional frame part element of the frame and for the frame part elements to be connected permanently to one another by way of a connecting area formed due to heating up and softening as well as hardening of the plastic material by means of the sonotrode.

Although this solution does not automatically provide for an inventive connection due to softening of the plastic material between a frame part element and the edge area of the flat material but does not exclude such a connection, this solution is advantageous since the possibility can be created in a simple manner, by connecting the two frame part elements, of also permanently fixing the edge area of the piece of flat material advantageously and, in particular, as a result of inexpensive production.

A particularly favorable form of realization provides for the end area of the piece of flat material to be connected to the wind blocker frame by form-locking elements, wherein these form-locking elements lead to a secure connection between the frame and the edge area of the piece of flat material when the two frame part elements connected to one another permanently via a connecting area prevent the form-locking elements holding the piece of flat material on the wind blocker frame from disengaging.

Alternatively thereto, it is, however, also conceivable to provide such form-locking elements in addition to all the solutions, with which the edge area of the piece of flat material is connected directly to at least one of the frame part elements due to softening and hardening of the plastic material.

In the case of such a form-locking connection between the frame and the edge area of the piece of flat material, one form-locking element is to be associated with the edge area of the piece of flat material.

In order to be able to connect this form-locking element reliably to the flat material it is preferably provided for the form-locking element associated with the flat material to be integrated into an edge reinforcement of the flat material so that a secure and stable connection exists between the flat material and the form-locking element.

In the simplest case, it is provided for the flat material to have form-locking elements designed as openings in its edge area.

Openings of this type may be produced particularly simply since no additional element has to be fixed on the edge area of the piece of flat material.

Furthermore, openings of this type are advantageous, in particular, in the case of woven or knitted fabrics since these can be designed such that they do not increase in size when stressed.

In this respect, it is particularly advantageous when the woven or knitted fabric is designed so as not to tear further or the openings are stabilized, in addition, against any further tearing.

When providing form-locking elements of the piece of flat material designed as openings it is favorable when the openings are penetrated by form-locking elements held on at least one of the frame part elements.

Form-locking elements of this type may, for example, be projections or cams or pins which are arranged on one of the frame part elements.

It is, however, also conceivable to form such form-locking elements by way of material agglomerations which result due to the effect of the sonotrode, i.e. due to the heating up and melting of plastic material.

For example, form-locking elements of this type may be pins or elevations provided on one frame part element which are deformed due to the ultrasonic effect and the resulting softening, i.e., are, for example, of a mushroom-like design so that they can permanently hold the respective opening they penetrate and thus the opening cannot disengage from the form-locking element.

In conjunction with the preceding explanations concerning the individual embodiments of the inventive solution, it has not been discussed in detail how the wind blocker frame itself is designed.

In the simplest case, the wind blocker frame can have a single frame part.

It is, however, also conceivable for the wind blocker frame to be constructed in several parts and for the frame part element required for the production of the connecting area to be only one part of the frame.

Another advantageous solution provides for the wind blocker frame to have frame parts abutting on one another along a dividing surface from opposite sides thereof and for the edge area of the piece of flat material to be held between them.

Such a solution allows a particularly secure and reliable fixing of the edge area of the piece of flat material on the frame.

One conceivable solution would be for the flat material to be held by form-locking elements extending between the two frame parts.

Form-locking elements of this type could, for example, be burls or cams integrally formed on one of the frame parts.

A particularly favorable solution provides for the form-locking elements to be formed by connecting areas connecting the frame parts and resulting due to softening and hardening of the plastic material, i.e. that the form-locking elements are, on the one hand, connecting areas which are created by the action of the sonotrode and connect the two frame parts to one another but, on the other hand, also represent at the same time form-locking elements which fix the edge area of the piece of flat material as such.

In this case, it is, for example, not absolutely necessary for a direct connection to exist via softened or melted plastic material between the edge area of the piece of flat material and one of the frame parts. It is sufficient for the frame parts themselves to be securely connected to one another and thus prevent the edge area of the piece of flat material from disengaging with its form-locking element from the form-locking element which connects the two frame parts to one another.

For example, the openings in the solution described above can already be preworked, i.e. the openings are already present in the edge area of the piece of flat material when this is placed on the corresponding frame part.

Alternatively thereto, it is, however, also conceivable for the openings to result in the edge area of the piece of flat material during the melting of the plastic material for the formation of the connecting areas due to heating up of the material forming the piece of flat material, i.e. that the openings do not result until the connecting areas are created between the two frame parts.

A further, advantageous solution provides for the connecting areas to be arranged directly between the frame parts and free from contact relative to the edge area of the piece of flat material for the permanent connection of the frame parts, i.e. that the connecting areas serve merely to fix the frame parts relative to one another but, on the other hand, the fixing, for example, the form-locking fixing of the edge area of the piece of flat material is brought about independently of the connecting areas formed due to the action of the sonotrode.

In conjunction with the explanations concerning the preceding embodiments no details have been given as to how the piece of flat material is intended to be held on the frame.

For example, it would be conceivable to produce the piece of flat material from a material which is, in itself, inherently inflexible so that a connection between the piece of flat material and the frame creates an inventive screen element.

In all the cases where the piece of flat material is, however, produced from a material which has a bending slackness it is preferably provided for the piece of flat material and the frame to be fixed relative to one another with initial tension, i.e. that in the case of the screen element itself the piece of flat material is always held in a clamped manner in the frame in order to achieve an advantageous optical effect of the piece of flat material.

Another solution provides alternatively to this for the piece of flat material to be clamped by means of a clamping member held on the frame, i.e. that an additional clamping member is provided on the frame which sees to it that the piece of flat material is held in the frame in a clamped manner.

One advantageous form of realization for this provides for the clamping member to be arranged on an attachment part fixed on the frame, i.e. that a part can be placed on the frame which bears the clamping member, namely positioned relative to the frame such that this provides for a clamping of the piece of flat material.

Another alternative solution provides for the clamping member to be arranged on one of two frame parts which are connected to one another so that the clamping member begins to act on the piece of flat material as a result of connection of the frame parts and thus the piece of flat material is acted upon such that this is held in the frame in a clamped manner.

A particularly favorable clamping of the piece of flat material may be achieved when the clamping member is of an elastic design.

In addition, the invention relates to a process for the production of a screen element for motor vehicles, in particular, a wind blocker or sun protection, comprising a frame and a piece of flat material held by the frame and extending over an area enclosed by the frame, wherein, in accordance with the invention, the piece of flat material is fixed permanently on the frame in that at least one frame part element consisting of a plastic material is connected to an additional part by way of a connecting area of the plastic material which is heated up by means of a sonotrode, softened and hardened.

The advantages of this inventive process are the same as those disclosed in conjunction with the inventive screen element, in particular, the advantages are to be seen in the simple producibility of such a screen element.

In this respect, it is particularly favorable when the at least one frame part element is connected to an edge area of the piece of flat material as additional part. It is possible to achieve a secure fixing of the piece of flat material on the frame in a particularly simple manner due to the direct connection of this type of the edge area of the piece of flat material to the frame part element.

Such a possibility provides for the piece of flat material to be embedded in the area softened by the sonotrode and subsequently hardened so that it is not necessary to melt the piece of flat material itself but rather a type of "form-locking fixing" can be brought about by this embedding.

Another possibility provides for the piece of flat material to be produced from a plastic material which is likewise heated up by ultrasound as well as softened and as a result a type of "weld connection" is generated with the plastic material of the frame part element due to the softened plastic materials flowing into one another.

With this variation of the inventive solution, it is thus possible to produce a true weld-like connection between the piece of flat material and the plastic material of the frame part element.

With respect to the type of production of the connection it would be conceivable to create a continuous constant connection along a connecting line. It has, however, proven to be particularly favorable and simple to cope with from the point of view of the technical process when the edge area of the piece of flat material is fixed on the frame part element in connecting areas arranged so as to follow one another at a distance along a connecting line.

Alternatively to providing the solution, with which the piece of flat material is fixed directly on the frame part element, it is likewise conceivable for the other part to be an additional frame part element of the frame and for the frame part elements to be connected to one another by a connecting area formed by way of the heating up, softening and hardening of the plastic material by means of the sonotrode.

As a result, there is no direct connection between the at least one frame part element and the piece of flat material but this solution likewise creates the possibility of fixing the piece of flat material securely and permanently due to the permanent connection of the frame part elements.

A further embodiment of an advantageous inventive solution provides for the frame to be formed from frame parts which abut on one another along a dividing surface from opposite sides thereof and between which the edge area of the piece of flat material is arranged.

This solution has the great advantage that the piece of flat material can be held securely between the two frame parts, wherein, on the one hand, it is possible merely to connect the frame parts to one another by way of a connecting area obtained due to melting of the plastic material but, on the other hand, it is also possible to connect the piece of flat material to at least one of the frame parts likewise via a connecting area consisting of melted plastic material.

With respect to the fixing of the piece of flat material on the frame, no further details have so far been given. One advantageous solution, for example, provides for the piece of flat material and the frame to be fixed relative to one another with initial tension. Such a fixing of the two relative to one another with initial tension can be realized in the most varied of ways.

For example, it is conceivable to tension the piece of flat material prior to fixing it on the frame and in this pretensioned position to fix it on the frame.

Another advantageous solution provides for the frame to be deformed in a manner acted upon by a force and then connected to the piece of flat material so that the frame, after release of the force acting upon it, has the tendency to move back into the original shape and thereby clamp the piece of flat material on account of its spring elastic properties.

Another advantageous solution provides for the piece of flat material to be clamped on the frame by providing a clamping member.

Such a solution provides first of all for a fixing of the flat material with little or slight tension on the frame and due to the additional attachment of the clamping member the possibility is created of holding the piece of flat material in the area bordered by the frame in a clamped manner.

In the embodiments described thus far no details have been given as to how superfluous flat material which projects beyond the frame is removed after the piece of flat material has been fixed on the frame. One possibility consists in removing this flat material by cutting.

Another possibility would be to produce blanks for the piece of flat material which already fit prior to it being fixed on the frame so that flat material does not project beyond the frame.

Another advantageous solution provides for the flat material projecting beyond the frame to be cut off by means of a cutting edge when the sonotrode acts on the frame part element.

This solution thus provides for not only a connecting area to be generated due to the action of the sonotrode by way of the melting of the plastic material but also, at the same time, a cutting off of superfluous flat material is possible due to interaction of the ultrasound with the cutting edge provided.

In this case, the cutting edge is preferably provided on a frame part element and, in addition, the cutting edge is preferably designed as a circular, continuous cutting edge so that a separation of the superfluous flat material is brought about, for example, along the entire outer contour of the frame.

The flat material is preferably designed such that it allows a person seated in the motor vehicle to see through it.

Particularly in the case of a wind blocker, the flat material is designed such that it allows the driver to see to the back through the flat material via the rearview mirror.

Furthermore, it is preferably provided in the case of a wind blocker for the flat material to be partially permeable to air, i.e. that the flat material does not represent a compact surface essentially impermeable to air.

This requirement makes it necessary to produce the flat material either as a film with perforations or as a braided, woven or knitted fabric which is permeable to air on account of the intermediate spaces and also allows it to be looked through. Furthermore, the fibers or wires of the piece of flat material are preferably woven so finely that they do not appreciably impede the view through it.

With respect to the material for a braided, woven or knitted fabric, the most varied of solutions are conceivable. In the simplest case, it is provided for these to be fibers, preferably plastic fibers.

It is, however, also conceivable to produce the braided, woven or knitted fabric from inherently inflexible fibers or also as, for example, carbon fibers or wires, in particular, metal wires.

Additional features and advantages of the invention are the subject matter of the following description as well as the drawings illustrating several embodiments.

In the drawings:

FIG. 1 shows a perspective view of a first embodiment of an inventive screen element, preferably usable as a wind blocker;

FIG. 2 shows a sectional, enlarged illustration of an area A in FIG. 1 prior to placement of an edge area of a piece of flat material;

FIG. 3 shows a schematic illustration of an edge area of a piece of flat material placed on the area according to FIG. 2 prior to action by the sonotrode;

FIG. 4 shows a schematic illustration of the action of the sonotrode on the edge area of the piece of flat material;

FIG. 5 shows a sectional, enlarged microphotograph of a connecting area with embedded fibers of a piece of flat material;

FIG. 6 shows a section along line 6—6 in FIG. 2 prior to placement of the edge area of the piece of flat material and prior to action by the sonotrode;

FIG. 7 shows an illustration of the section according to FIG. 6 after action by the sonotrode and formation of the connecting area;

FIG. 8 shows a schematic illustration of one possibility of a process for attaching the piece of flat material in the pretensioned state to a frame with FIG. 8a the pretensioning of the flat material on a clamping frame;

Figure 16:
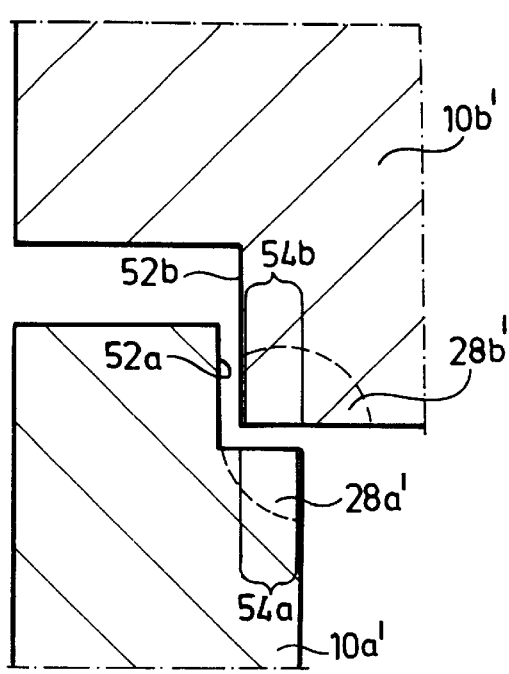
Figure 17:
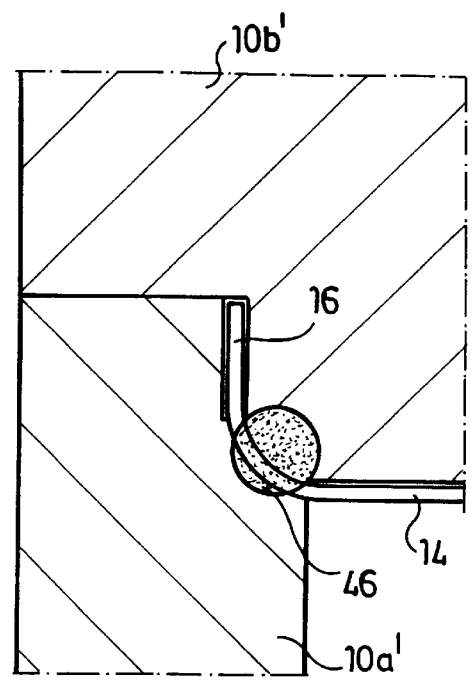
Figure 18:
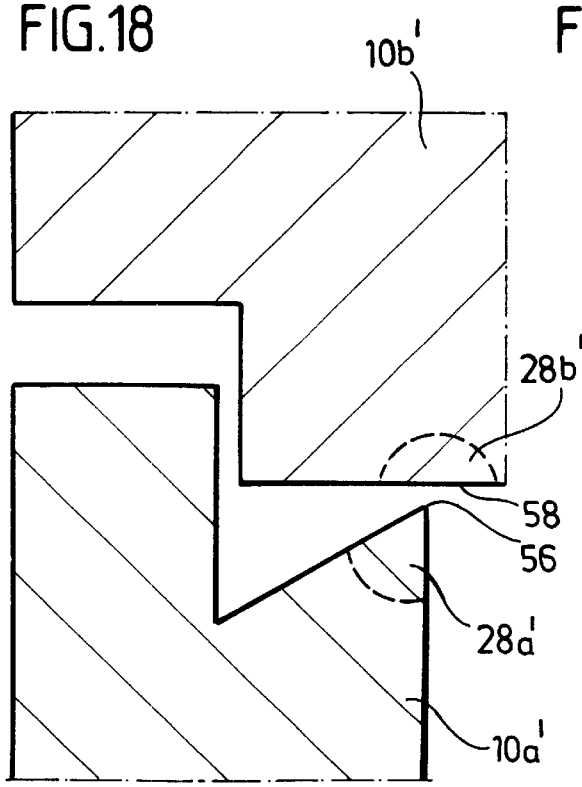
Figure 19:
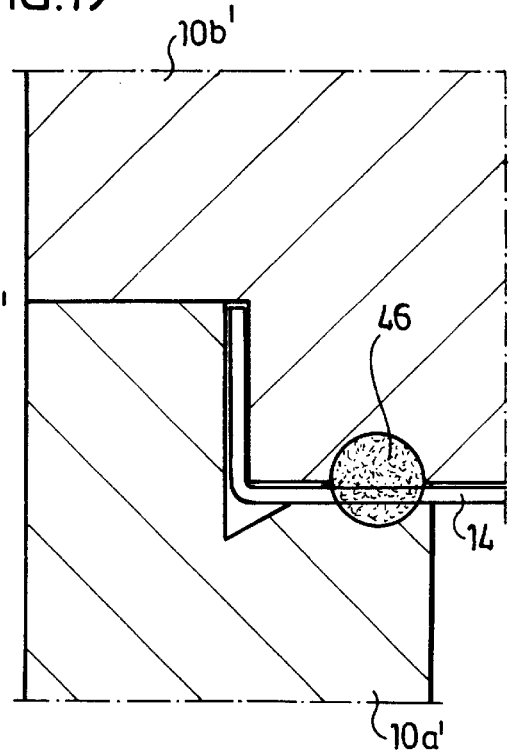
Figure 26:
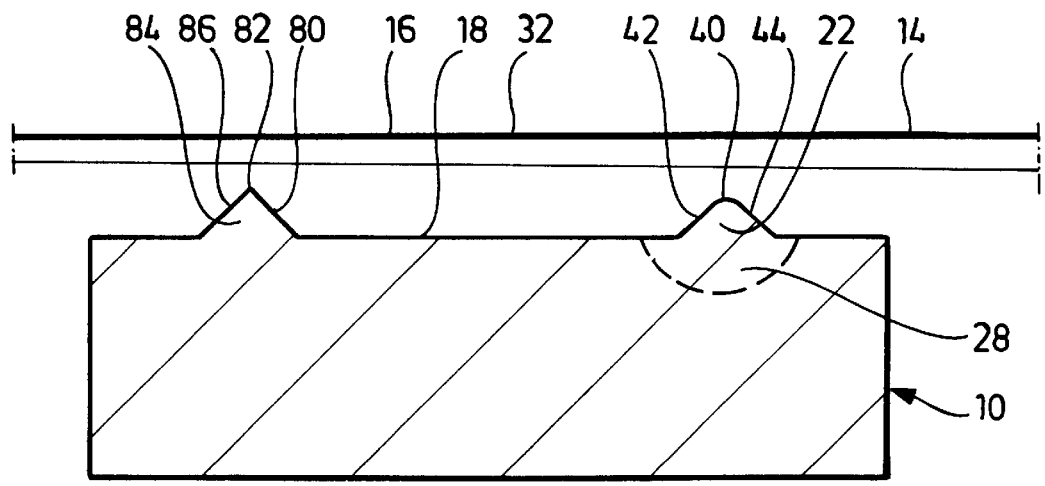
Figure 27:
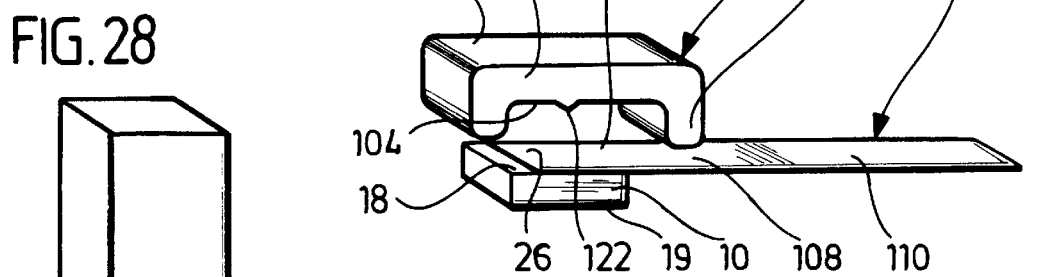
Figure 28:
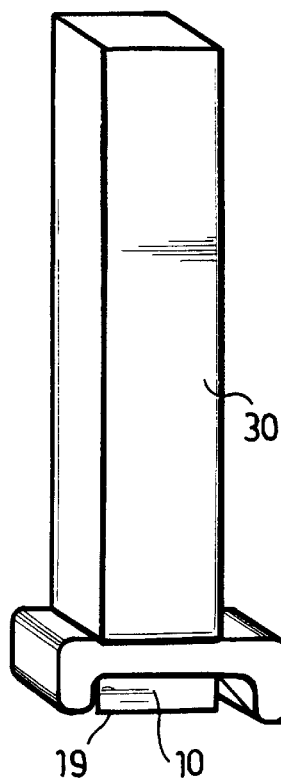
Figure 29:
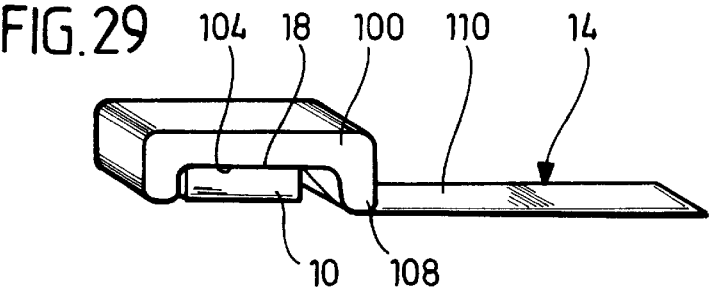
Figure 30:
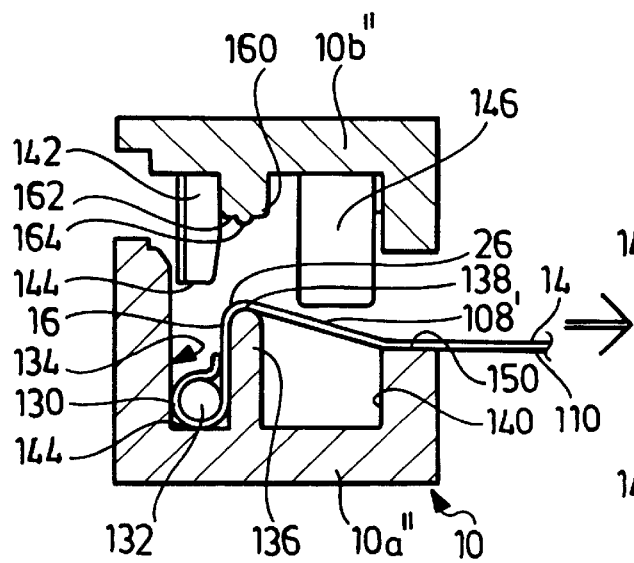
Figure 31:
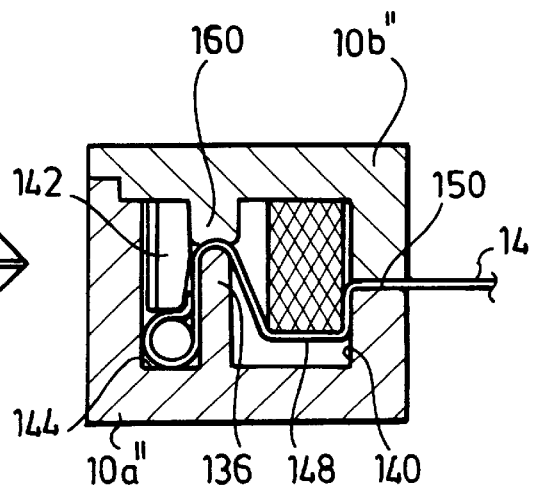
Figure 32:
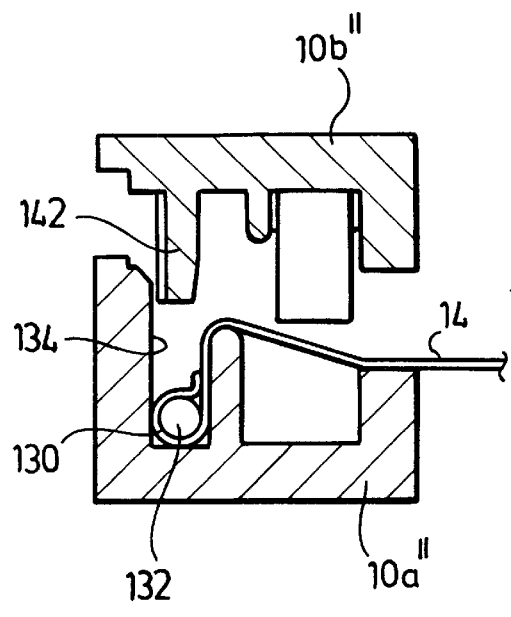
Figure 33:
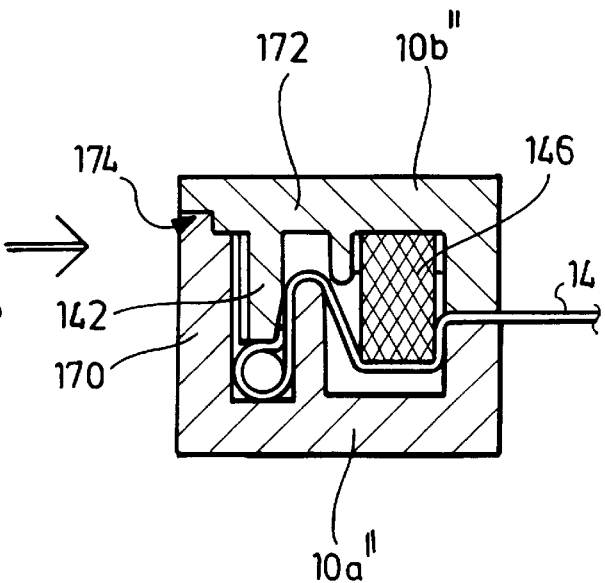
Figure 34:
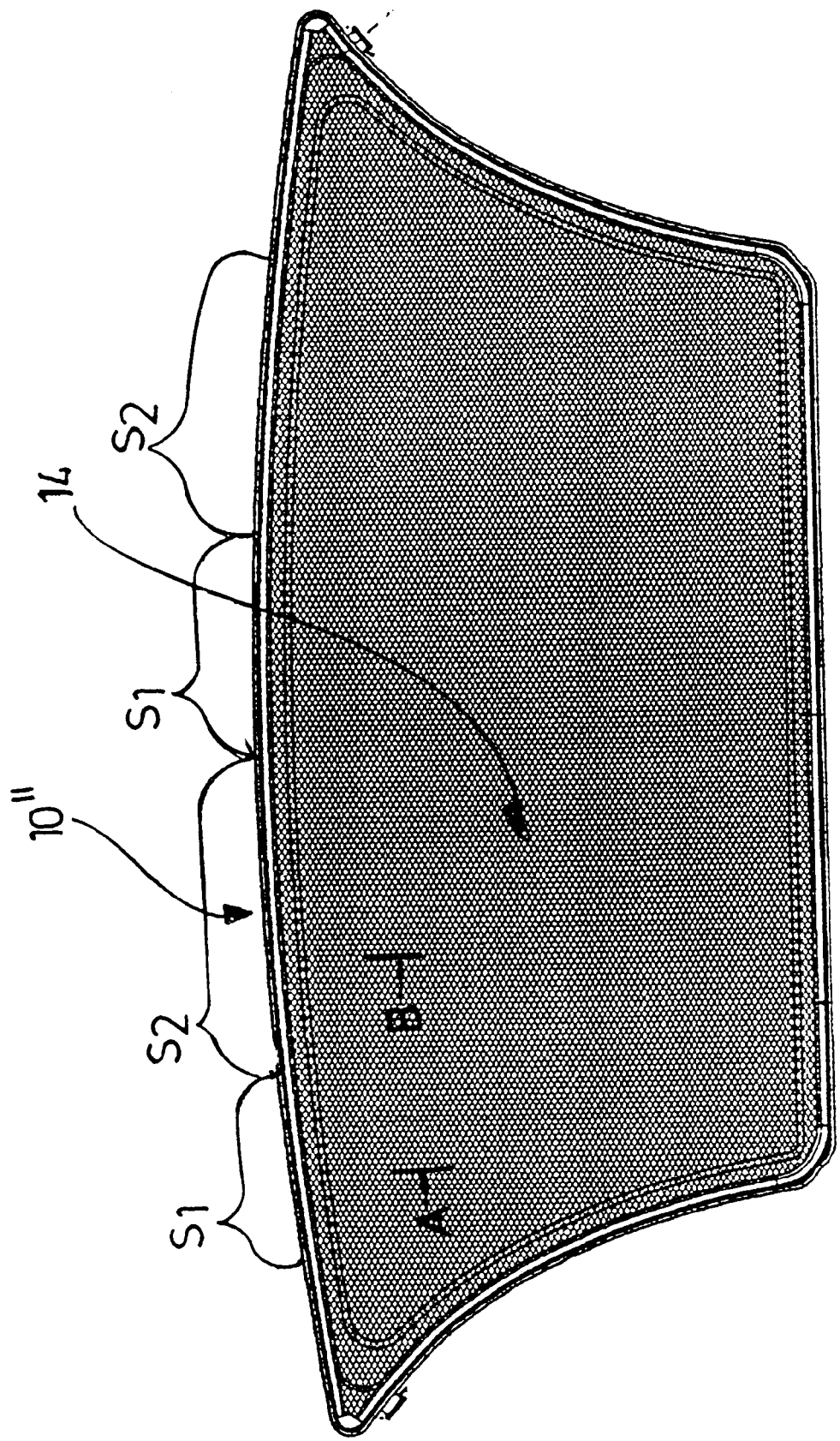

FIG. 8b the clamping of the flat material over the frame;

FIG. 8c the action of the sonotrode for fixing the pretensioned piece of flat material on the frame and FIG. 8d the finished screen element;

FIG. 9 shows a schematic sectional illustration of the parts to be connected to one another for the second embodiment of the inventive screen element;

FIG. 10 shows an illustration similar to FIG. 9 with action of the sonotrode;

FIG. 11 shows a schematic illustration of the finished screen element with a piece of flat material fixed between frame parts;

FIG. 12 shows a sectional illustration of the fixing of the piece of flat material with simultaneous connection of the frame parts in the second embodiment;

FIG. 13 shows a schematic illustration of production of the second embodiment of the inventive screen element with FIG. 13a a schematic illustration of the positioning of the flat material;

FIG. 13b clamping of the flat material after positioning;

FIG. 13c abutment of the frame parts with clamped flat material;

FIG. 13d positioning of the frame parts relative to one another with clamped flat material;

FIG. 13e the fixing of the frame parts on one another by means of sonotrodes and FIG. 13f the finished screen element according to the second embodiment;

FIG. 14 shows a schematic illustration of fixing of the edge area of the piece of flat material in a third embodiment;

FIG. 15 shows a schematic illustration of the fixing of the edge area of the piece of flat material in a fourth embodiment;

FIG. 16 shows a schematic cross section through two frame parts of a fifth embodiment;

FIG. 17 shows a schematic illustration of the fixing of the two frame parts of the fifth embodiment illustrated in FIG. 16;

FIG. 18 shows a cross section through two frame parts of a sixth embodiment similar to FIG. 16;

FIG. 19 shows a cross section through the frame parts of the sixth embodiment connected to one another similar to FIG. 17;

FIG. 20 shows a plan view similar to FIG. 2 of a seventh embodiment;

FIG. 21 shows a perspective illustration of a section of the frame and a section of the piece of flat material in the seventh embodiment prior to the connection of the two to one another;

FIG. 22 shows an illustration similar to FIG. 21 of a first variation of the seventh embodiment;

FIG. 23 shows an illustration similar to FIG. 21 of a second variation of the seventh embodiment;

FIG. 24 shows an illustration similar to FIG. 21 of a third variation of the seventh embodiment;

FIG. 25 shows an illustration of an eighth embodiment with flat material placed on a frame part element prior to production of the connecting area;

FIG. 26 shows a section similar to FIG. 6 through the frame part element of the eighth embodiment;

FIG. 27 shows a schematic illustration of a ninth embodiment with an edge area of the piece of flat material already connected to the frame and prior to attachment of an attachment part;

FIG. 28 shows a schematic illustration of the fixing of the attachment part by means of a sonotrode in the ninth embodiment;

FIG. 29 shows a section similar to FIG. 27 through the ninth embodiment with attached attachment part;

FIG. 30 shows a section through a tenth embodiment of an inventive screen element prior to assembly of the two frame parts;

FIG. 31 shows a section similar to FIG. 30 through the frame parts of the tenth embodiment connected to one another;

FIG. 32 shows a section similar to FIG. 30 through an eleventh embodiment;

FIG. 33 shows a section similar to FIG. 31 through the eleventh embodiment;

FIG. 34 shows a perspective view of a screen element of a twelfth embodiment.

One embodiment of an inventive screen element for motor vehicles, for example, a wind blocker, illustrated in FIG. 1, comprises a frame which is designated as a whole as 10 and encloses a surface area 12.

A piece of flat material 14, which extends over the area enclosed by the frame 10, is connected to the frame 10 for covering the surface area 12.

The piece of flat material is preferably produced from a film allowing a view through it or from a woven or knitted fabric allowing a view through it, wherein thin threads are preferably used for the woven or knitted fabric.

In the first embodiment, as illustrated in FIGS. 1 and 2, the piece of flat material 14 is fixed with an outer edge area 16 on one side, for example, an upper side 18 of the frame 10.

In order to fix the piece of flat material 14 in place, the upper side 18 of the frame 10 produced from a thermoplastic material is provided with energy directing elements 22 which are arranged along a connecting line 20, rise above the upper side 18 and extend along the connecting line 20 over a length L, wherein a distance A remains each time between the individual energy directing elements 22 (FIG. 2).

If the piece of flat material 14 is now placed with its edge area 16 on the upper side 18 with the energy directing elements 22 such that a first side 24 of the edge area 16 facing the frame 10 rests on the energy directing elements 22 (FIG. 3) and a second side 26 located opposite the first side 24 is acted upon with a front surface 32 of a sonotrode designated as a whole as 30 (FIG. 4), the plastic material is heated up and softened, when the sonotrode is in operation, in a frame part element 28 of the frame 10 comprising the energy directing elements 22 such that a plastic melt of the thermoplastic material of the frame part elements 28 results in the area of the energy directing elements 22 and these parts saturate the edge area 16 of the piece of flat material 14 designed, for example, as a knitted fabric and thus lead to the fibers 34 of the knitted fabric being embedded in a melted connecting area 36 which, after its hardening, fixes the fibers 34 of the knitted fabric securely on the frame 10 (FIG. 5).

In order to achieve an efficient heating up, softening and melting of the plastic in the energy directing element 22 by means of the sonotrode 30, it is preferably provided for the energy directing element 22 to have in cross section, as illustrated in FIG. 6, a curvature 40 at its tip and, proceeding from this curvature, two inclined surfaces 42 and 44 which extend in a roof-like shape towards the upper side 18 of the frame 10.

As a result of the curvature 40 at the tip of the energy directing element 22, a destruction of the fibers 34 during the heating up of the plastic material due to ultrasound is avoided and so the fibers 34 are embedded essentially undamaged into a material agglomeration 46 of the plastic material formed from the energy directing element 22, this material agglomeration surrounding the fibers 34 in the connecting area 36, as illustrated in FIG. 7, and thus creating a type of form-locking connection between the frame 10 and the fibers 34 of the knitted fabric.

In order to be able to fix the piece of flat material 14 on the frame 10 in a clamped state, a flat material 13 is, as illustrated in FIG. 8, inserted into a clamping frame 48 and fixed in the clamping frame 48.

If the frame 10 is then, for example, pressed from below against the flat material 13 and lifted, the flat material 13, which is fixed in the clamping frame 48, is clamped and thus the piece of flat material 14 extending over the surface 12, as well.

In the pretensioned state of the piece of flat material 14, the plastic melt is now generated with a plurality of sonotrodes in the area of the individual energy directing elements 22 so that the pretensioned piece of flat material 14 is fixed securely on the frame 10.

The inventive screen element can then be produced with a piece of flat material 14 held clamped on the frame 10 by removing the sonotrodes and cutting the flat material 13 in the area projecting beyond the clamping frame 48.

In a second embodiment of an inventive wind blocker frame, illustrated in FIGS. 9 to 10, the frame 10 is formed from two frame parts 10a and 10b, wherein one of the frame parts, for example, the frame part 10a has the energy directing elements 22 which project upwards above the upper side 18a of the frame part 10a.

The edge area 16 of the piece of flat material 14 is now placed on the upper side 18a with the energy directing elements 22 of the frame part 10a in the same way as that described in conjunction with the first embodiment and, in addition, the frame part 10b is placed on the second side 26 of the edge area 16 such that its side 18b faces the side 18a and rests on the second side 26 of the edge area 16.

As a result of the frame part 10b being acted upon on its side 19b facing away from the side 18b with the front side 32 of the sonotrode 30, as illustrated in FIG. 10, the plastic material is again heated up, melted in the area of the energy directing elements 22 so that a plastic melt again results in the area thereof which saturates, for example, the knitted fabric of the piece of flat material 14 so that a material agglomeration 46 likewise results, as illustrated in FIG. 7 of the first embodiment, and at the same time a slight softening and melting of the plastic material of the frame part 10b results in the area of the material agglomeration 46 so that, altogether, as illustrated in FIG. 11 and FIG. 12, the fibers 34 are embedded in a material agglomeration 46 which is first melted and then hardened again and which, however, extends at the same time from the side 18a of the frame part 10a as far as the side 18b of the frame part 10b and thus connects the frame parts 10a and 10b to one another at the same time, in addition to the embedding of the fibers 34 (FIG. 12).

The clamping of the piece of flat material 14 may also be brought about in the second embodiment in the same way as in the first embodiment, wherein, in this case, the first frame part 10a is placed from below against the flat material 13 while the second frame part 10b is placed from above onto the clamped piece of flat material.

Alternatively thereto, there is, however, also the possibility in the second embodiment, in accordance with FIG. 13, of inserting the piece of flat material into a clamping frame 48' which also provides for a positioning of the flat material 13 primarily by way of projections 49 and which is in a position to clamp the flat material 13 with a plurality of tensioning elements 47 (FIG. 13b).

If the flat material 13 is clamped, the frame parts 10a and 10b are placed on it, positioned relative to one another (FIG. 13c and FIG. 13d), for example, via form locking and subsequently, as illustrated in FIG. 13e, they are acted upon by ultrasound by means of a plurality of sonotrodes 30 for generating the plastic melt in the area of the energy directing elements 22.

After the superfluous parts of the flat material 13 have been cut off, the screen element is then present, as illustrated in FIG. 13f, with a piece of flat material 14 clamped in the frame 10.

The preceding explanations of the first and second embodiments assume that the piece of flat material 14 consists, for example, of a knitted fabric, the fibers of which are temperature-resistant insofar as they do not substantially alter their structure at the temperature occurring during application of the sonotrode 30 and the carrying out of the ultrasonic welding.

If, however, the piece of flat material 14 is produced, for example, from a knitted fabric, the fibers of which likewise melt during the resulting plastic melt in the area of the energy directing elements 22, a plastic melt consisting of a mixture of the plastic of the energy directing element 22 and the plastic of the fibers 34 results in the connecting area 36, as illustrated schematically, for example, in a third embodiment in FIG. 14, and altogether a material agglomeration 46' results with such a mixed and later hardened melt, in which the fibers 34 are likewise held.

Such a material agglomeration 46' can occur not only during fixing of the piece of flat material 14 in accordance with the first embodiment but also the second embodiment.

A fourth embodiment, illustrated schematically in FIG. 15, represents a special form of the second embodiment. With this fourth embodiment, as illustrated in FIG. 15, the formation of a plastic melt likewise takes place in the area of the energy directing element 22 during ultrasonic heating but this plastic melt leads to the fibers 34 of the knitted fabric of the piece of flat material 14 being destroyed at least partially if not completely so that an opening 50 surrounding the resulting material agglomeration 46" results in the edge area 16 of the piece of flat material 14 but no longer any connection between the fibers 14 and the melted and again hardened material agglomeration 46".

The material agglomeration 46" serves merely to connect the frame part 10a and the frame part 10b to one another, between which the edge area 16 is then located and on which the edge area 16 is held in a manner "similar to form locking" in that the material agglomeration 46" penetrates the opening 50 which is formed in the manner of a bridge between the frame parts 10a and 10b and thus the material agglomeration 46" fixes the edge area 16 completely in that it penetrates the opening 50, wherein the size of the opening 50 is formed in accordance with the formation of the size of the material agglomeration 46" itself and thus encloses the material agglomeration 46" essentially abutting on it. With this embodiment the material of the knitted fabric is preferably such that it does not tear further when a fiber 34 is destroyed and so the openings 50 do not become larger during the course of time.

In a fifth embodiment, illustrated in FIGS. 16 and 17, it is also possible alternatively to the provision of the energy directing elements 22 to design the frame parts 10a' and 10b' with steps 52a and 52b which correspond to one another but are of an unequal height so that when the frame parts 10a and 10b are pressed together the two frame parts 10a and 10b engage in a narrow area 54a and 54b which corresponds with respect to its function to the energy directing element 22 so that the formation of the plastic melt and thus the formation of a weld connection between the frame parts 10a and 10b takes place in the respectively corresponding frame part element 28a' and 28b', wherein, in this case, it is possible to also weld in the piece of flat material 14 placed between them with the edge area 16, as illustrated in FIG. 17.

In a sixth embodiment, illustrated in FIG. 18 and FIG. 19, the same principle as in the fifth embodiment is fundamentally used but with the difference that the frame part element 28a' forms a tip 56 whereas the frame part element 28b' forms a flat side 58 which can be placed on the tip, wherein during the ultrasonic welding which then takes place the formation of a plastic melt and the material agglomeration 46 again likewise takes place and this saturates the edge area 16 of the piece of flat material 14 and, in addition, connects the frame parts 10a' and 10b', as illustrated in FIG. 19.

In a seventh embodiment, illustrated in FIGS. 20 and 21, those elements which are identical to those of the first embodiment are given the same reference numerals and so reference can be made to the comments on the first embodiment with respect to the description hereof in detail.

In the same way as in the first embodiment, the individual energy directing elements 22 are arranged along the connecting line 20.

Additional form-locking members 62, which likewise project above the upper side 18 of the frame 10, are provided at a distance from one another along a line 60 parallel to the connecting line 20.

In order to fix the piece of flat material 14 in place, the edge area 16 thereof is provided with openings 64 which are located after placement of the edge area 16 such that the projections 62 pass through the openings 64 and thus already provide a form-locking connection between the frame 10 and the piece of flat material 14 which allows, for example, clamping of the piece of flat material 14 prior to this being acted upon with ultrasound. Furthermore, such a form-locking connection with the form-locking elements 62 and 64 represents an additional securing of the piece of flat material on the frame 10.

The final, permanent connection to the frame 10 is still brought about via the heating up and melting of the energy directing elements 22 thereby forming the connecting areas 26, as described in detail in conjunction with the first embodiment.

In a first variation of the seventh embodiment, illustrated in FIG. 22, the seventh embodiment is modified in that the edge area 16 is provided with an additional reinforcement 66, wherein the openings 64 then penetrate not only the reinforcement 66 but also the edge area of the piece of flat material 14.

In a further variation, illustrated in FIG. 23, the reinforcement 66 is formed by a folded loop 68, wherein openings 64a and 64b located congruently opposite one another are provided in the two loop layers.

In a third variation of the seventh embodiment, illustrated in FIG. 24, the loop 68 is provided, in addition, with a welt element 70 placed in it which allows an even better, tear-resistant fixing of the loop 68 via the openings 64a and 64b with the form-locking elements 62.

As for the rest, the piece of flat material 24 is connected to the frame 10 in the edge area 16 via the melting of the energy directing elements 22 and embedding of the fibers, as already explained in detail in conjunction with the first embodiment.

In the seventh embodiment and all the variations described for this, it is also possible, in the same way as in the second embodiment, to use two frame parts 10a and 10b, wherein one of the frame parts, for example, the frame part 10a bears the energy directing elements 22 and the form-locking elements 62 and after the edge area 16 of the piece of flat material 14 is in place the frame part 10b is placed on top and the plastic material in the area of the energy directing elements 22 and the form-locking members 62 is heated up and melted by means of a sonotrode acting on the frame part so that a connection is brought about between the frame parts 10a and 10b with a simultaneous embedding of the fibers 34 of the piece of flat material 14.

It is, however, also possible to use a piece of flat material consisting of melting fibers so that a connection is brought about in a similar way to the third embodiment, illustrated in FIG. 14.

In an eighth embodiment, illustrated in FIGS. 25 and 26, not only the energy directing elements 22 arranged along the connecting line 20 are arranged on the frame 10 on its upper side 18 but rather a continuous cutting edge 82 is preferably provided on a side facing away from the surface area 12 enclosed by the frame 10, preferably near to an outer edge 80 of the frame, this cutting edge being arranged at the top of a bead 84 with inclined surfaces 86 and 88 extending in the shape of a roof relative to one another, wherein the bead 84 preferably has the same height above the upper side 18 as the energy directing elements 22 arranged along the connecting line 20.

As a result of the fact that a cutting edge 82 is provided which is of as sharp a design as possible, a considerable mechanical stressing of the fibers 34 takes place in the area of the cutting edge 82 during the action of the sonotrode 30 with the flat side 32 on the edge region 16 of the flat material and so this is cut off along the cutting edge 82 extending along a cutting line 90, wherein the cutting line 90 extends, for example, at a constant distance to the outer edge 80 of the frame 10.

Furthermore, in the same way as that described in conjunction with the first embodiment, the edge area 16 of the piece of flat material 14 is embedded in the area of the energy directing element 22 thereby forming the material agglomeration 46 and fixed on the frame 10.

With this embodiment, any cutting of the piece of flat material 14 either prior to the connection to the frame 10 or thereafter is unnecessary since, in one process by means of the ultrasonic welding, a connection is provided between the edge area 16 of the piece of flat material 14 and the frame 10, on the one hand, and a separation along the cutting line 90 at the same time.

In a ninth embodiment, illustrated in FIGS. 27, 28 and 29, the edge area 16 of the piece of flat material 14 is first of all fixed on the frame 10 based on the solution of the eighth embodiment and the superfluous flat material 13 cut away and, subsequently, the piece of flat material 14 is clamped over the area 12 enclosed by the frame 10 in that an attachment part 100 with an inverse U shape is placed on the frame 10. This attachment part can be placed, on the one hand, with its central area 102 on the second side 26 of the edge area 16 and during placement of the central area 102 with its surface 104 facing the second side 26 the piece of flat material 14 is acted upon in its area 108 essentially immediately adjacent the frame 10 by means of a nose 106 projecting beyond the central area 102 and beyond the side 104 and moved away from the upper side 18 in the direction of the underside 19, as illustrated in FIG. 28, and as a result clamping is generated in an inner area 110 of the piece of flat material 14 located within the frame 10, as illustrated in FIG. 29.

In order to connect the attachment part 100 to the frame 10, the attachment part 100 is preferably provided with an energy directing element 122 which projects beyond its side 104 and melts when the sonotrode 30 acts on the attachment part 100, namely on its side 112 facing away from the side 104 and, in this respect, a connection is provided between the attachment part 100 and the frame 10 in the same way as that described in conjunction with the preceding energy directing elements 22.

In a tenth embodiment, illustrated in FIGS. 30 and 31, the frame 10 comprises a frame part 10a" and a frame part 10b" similar to the second embodiment.

In contrast to the second embodiment, the piece of flat material 14 is folded in its edge area 16 to form a loop 130 and a welt element 132 is inserted into this loop 130 and forms an outermost edge of the piece of flat material 14 together with the loop 130.

The welt element 132 with the loop 130 can be inserted into a groove 134 of the frame part 10a" which is limited towards the inner area 110 via an arm 136, the edge area 16 of the piece of flat material 14 extending over the upper edge 138 of this arm.

A recess 140 is provided on the side of the arm 136 located opposite the groove 134 and the piece of flat material 14 extends with the area 108' over this recess.

In this embodiment, the frame part 10b" is provided, on the one hand, with a hold-down arm 142 which is arranged so as to be located opposite the groove 134 and acts with its front side 144 on the loop 130 surrounding the welt element 132 and thus acts upon the loop 130 with the welt element 132 located therein in the direction of a groove base 144 of the groove 134.

Furthermore, an elastic clamping member 146 is provided on the frame part element 10b" located opposite the recess 140 and this clamping member acts upon the piece of flat material 14 in the area 108' next to the arm 136 during the placement of the frame part element 10b" and presses it into the recess 140 thereby forming a deflected loop 148, wherein the piece of flat material 14 preferably forms the deflected loop 148 resting on the pressure member 146, proceeding from the contact surface 138 of the arm 136, and again rests on an inner contact surface 150 of the frame part element 10a" which is arranged on a side of the recess 140 facing the inner area 110 of the piece of flat material.

Furthermore, the frame part 10b" is provided with a connecting arm 160 which extends so as to be aligned with the arm 136 and on its side 162 facing the arm 136 with the contact surface 138 bears an energy directing element 164 which rests on the second side 26 of the edge area 16 opposite the contact surface 138 when the frame part 10b" is placed on the frame part 10a".

If the frame part 10b" is now acted upon with a sonotrode 30, the plastic material is heated up and softened in the area of the energy directing element 164, in the same way as that explained in detail in conjunction with the first embodiment, to the point of the formation of a plastic melt which saturates the piece of flat material 14 in its area resting on the energy directing element 164 and thus also softens the arm 136 in the area of the contact surface 138 so that, altogether, a connection results between the frame part element 10a" and the frame part element 10b" via a plastic melt forming in the area of the energy directing element 164.

At the same time, on account of the design of the clamping member 146 consisting of an elastic material, for example, expanded rubber a constant, elastic clamping of the piece of flat material 14 is brought about in its inner area 110 due to a correspondingly large formation of the deflected loop 148.

In an eleventh embodiment, illustrated in FIGS. 32 and 33, the frame 10 comprises the frame part elements 10a" and 10b", in the same way as in the eighth embodiment, wherein the connecting arm 160 is, however, not provided.

On the contrary only a type of form-locking fixing of the piece of flat material 14 takes place via the welt element 132 in the loop 130, wherein both are pressed into the groove 134 by the hold-down element 142.

The permanent fixing of the frame parts 10a" and 10b" relative to one another is brought about by ultrasonic welding, for example, in the area of an outer wall arm 170, on which an upper arm 172 of the frame part element 10b" bearing the hold-down element 142 and the pressure member 146 can be placed so that a weld seam 174 results directly between the frame part 10a" and the frame part 10b" due to melted plastic and this seam connects the two frame parts 10a" and 10b" to one another without a simultaneous embedding or welding of the piece of flat material 14 taking place. This is held merely by the form-locking elements 134 and 142 acting on the welt element 132 and the loop 130 and, in addition, tensioned by the clamping member 146.

In a twelfth embodiment, illustrated in FIG. 34, it is possible to divide the fixing of the piece of flat material 14 on the frame 10" into segments S1 and S2, wherein, for example, a fixing takes place in accordance with FIGS. 30 and 31 in the case of the segments S1 and in the segments S2 a fixing in accordance with FIGS. 32 and 34 and the segments S1 and S2 alternatingly follow one another.

What is claimed is:

1. A process for the production of at least one of a wind blocking or sun protecting screen element for motor vehicles having a frame and a piece of flat material held by the frame and extending over an area enclosed by the frame, comprising:

permanently affixing the piece of flat material to the frame; and connecting at least one frame part element consisting of a plastic material to an additional part by way of a connection area of the plastic material heated up by means of a sonotrode, softened and hardened.

2. A process as defined in claim 1, wherein the at least one frame part element is connected to an edge area of the piece of flat material as additional part.

3. A process as defined in claim 2, wherein the piece of flat material is embedded in the area softened by the sonotrode and subsequently hardened.

4. A process as defined in claim 2, comprising:

producing the piece of flat material from a plastic material likewise heated up by ultrasound as well as softened; and generating as a result a connection with the plastic material of the frame part element due to the softened plastic materials flowing into one another.

5. A process as defined in claim 1, wherein an edge area of the piece of flat material is fixed on the frame part element in connecting areas arranged so as to follow one another at a distance along a connecting line.

6. A process as defined in claim 1, wherein:

the additional part is a further frame part element of the frame; and the frame part elements are connected to one another by a connecting area formed by way of the heating up, softening and hardening of the plastic material by means of the sonotrode.

7. A process as defined in claim 1, wherein the frame is formed from frame parts abutting on one another along a dividing surface from opposite sides thereof, an edge area of the piece of flat material being arranged between said parts.

8. A process as defined in claim 1, wherein the piece of flat material and the frame are fixed relative to one another with initial tension.

9. A process as defined in claim 1, wherein the piece of flat material is clamped on the frame due to an arrangement of a clamping member.

10. A process as defined in claim 1, wherein flat material projecting beyond the frame is cut off by means of a cutting edge when the sonotrode acts on the frame part element.

11. A process as defined in claim 5, wherein the connecting areas are arranged at a distance from one another corresponding in order of magnitude to an extension of the connecting areas in the direction of the connecting line.

12. A process as defined in claim 1, wherein the connecting areas are predetermined by plastic material agglomerations.

13. A process as defined in claim 12, wherein the frame part element is provided with the plastic material agglomerations forming the connecting areas.

14. A process as defined in claim 1, wherein an edge area of the flat material is permanently fixed to the frame part element only in connecting areas following one another along a connecting line.

15. A process as defined in claim 1, wherein an edge area of the piece of flat material is connected to the frame by form-locking elements.

16. A process as defined in claim 15, wherein the form-locking element associated with the piece of flat material is integrated into an edge reinforcement of the flat material.

17. A process as defined in claim 15, wherein the piece of flat material has form-locking elements comprising openings in its edge area.

18. A process as defined in claim 17, wherein the openings are penetrated by form-locking elements held on at least one of the frame part elements.

19. A process as defined in claim 7, wherein the piece of flat material is held by form-locking elements extending between the two frame parts.

20. A process as defined in claim 19, wherein the form-locking elements are formed by connecting areas connecting the frame parts and resulting due to softening and hardening of the plastic material.

21. A process as defined in claim 20, wherein:

the piece of flat material has form-locking elements comprising openings in its edge area; and said openings resulted during the melting of the plastic material for the formation of the connecting areas due to heating up of the material forming the piece of flat material.

22. A process as defined in claim 7, wherein:

for a permanent connection of the frame parts, the connecting areas are arranged directly between the frame parts and free from contact relative to the edge area of the piece of flat material.

23. A process as defined in claim 9, wherein the clamping member is arranged on an attachment part fixed on the frame.

24. A process as defined in claim 23, wherein the clamping member is arranged on one of two frame parts.

25. A process as defined in claim 24, wherein the clamping member is of an elastic design.

* * * * *